United States Patent

Sonoda

(10) Patent No.: US 9,689,668 B2
(45) Date of Patent: Jun. 27, 2017

(54) IMAGE PROCESSING APPARATUS AND IMAGE PROCESSING METHOD

(71) Applicant: CANON KABUSHIKI KAISHA, Tokyo (JP)

(72) Inventor: Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 14/593,249

(22) Filed: Jan. 9, 2015

(65) Prior Publication Data

US 2015/0204661 A1 Jul. 23, 2015

(30) Foreign Application Priority Data

Jan. 17, 2014 (JP) .................................. 2014-007270

(51) Int. Cl.
G01B 11/24 (2006.01)
G01B 11/25 (2006.01)
G06T 7/521 (2017.01)

(52) U.S. Cl.
CPC .......... G01B 11/2513 (2013.01); G06T 7/521 (2017.01)

(58) Field of Classification Search
CPC . G06T 19/00; G06T 5/00; G06T 11/00; G06T 7/00; G01B 11/00
USPC ................................................ 356/600–640
See application file for complete search history.

(56) References Cited

U.S. PATENT DOCUMENTS 6,480,192 B1* 11/2002 Sakamoto ............... A63F 13/10
345/419
8,970,853 B2 3/2015 Takabayashi et al.
9,074,879 B2* 7/2015 Suzuki ................. G01B 11/026
2005/0046873 A1* 3/2005 Suzuki .................. G06T 7/0057
356/605
2007/0206204 A1* 9/2007 Jia ........................ G01B 11/254
356/604
2010/0265177 A1* 10/2010 Fujimoto ................ G06T 11/00
345/162
2013/0063566 A1* 3/2013 Morgan-Mar ........ G06T 7/0069
348/46
2013/0127998 A1* 5/2013 Kobayashi ............. G01B 11/00
348/46
2013/0156268 A1 6/2013 Sonoda
2013/0229666 A1 9/2013 Suzuki et al.
(Continued)

FOREIGN PATENT DOCUMENTS

JP 2001-147110 A 5/2001

*Primary Examiner* — Tarifur Chowdhury
*Assistant Examiner* — Isiaka Akanbi
(74) *Attorney, Agent, or Firm* — Fitzpatrick, Cella, Harper & Scinto

(57) ABSTRACT

A projection pattern as an image obtained by compositing the first two-dimensional pattern image and the second two-dimensional pattern image is projected onto an object, and the object onto which the projection pattern has been projected is captured. The three-dimensional shape information of the object is measured based on the projection pattern and the captured image. When a region formed from one or a plurality of pixels is set as the first unit area, and a region having a size larger than that of the first unit area is set as the second unit area, each first unit area of the first two-dimensional pattern image is assigned with one of a plurality of pixel values, and each second unit area of the second two-dimensional pattern image is assigned with one of the plurality of pixel values.

15 Claims, 14 Drawing Sheets

(56) References Cited

U.S. PATENT DOCUMENTS

| | | | |
|---|---|---|---|
| 2013/0294679 A1* | 11/2013 | Jeong | G01B 11/25 382/147 |
| 2014/0063192 A1* | 3/2014 | Sonoda | G01B 11/2513 348/46 |
| 2014/0267246 A1 | 9/2014 | Suzuki et al. | |

* cited by examiner

F I G. 9
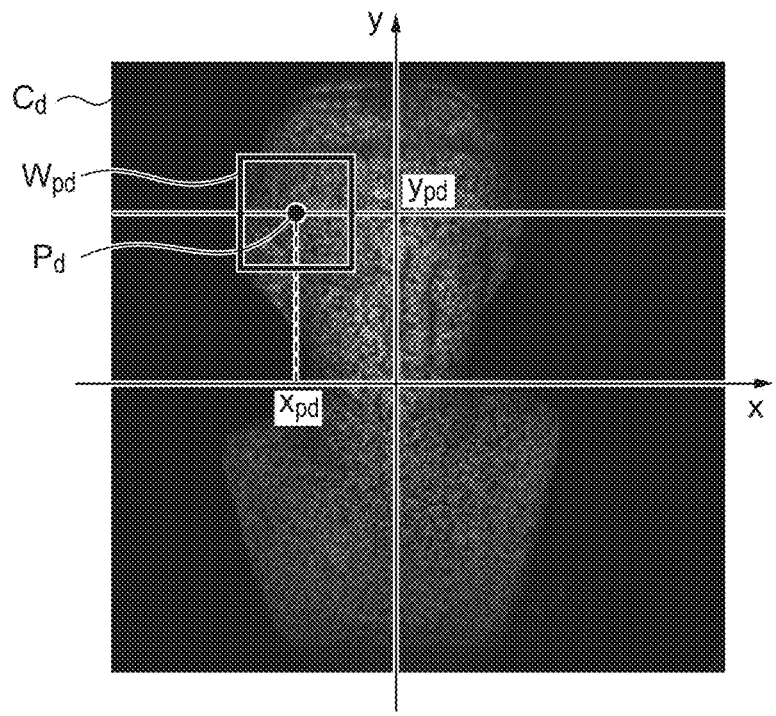
F I G. 10
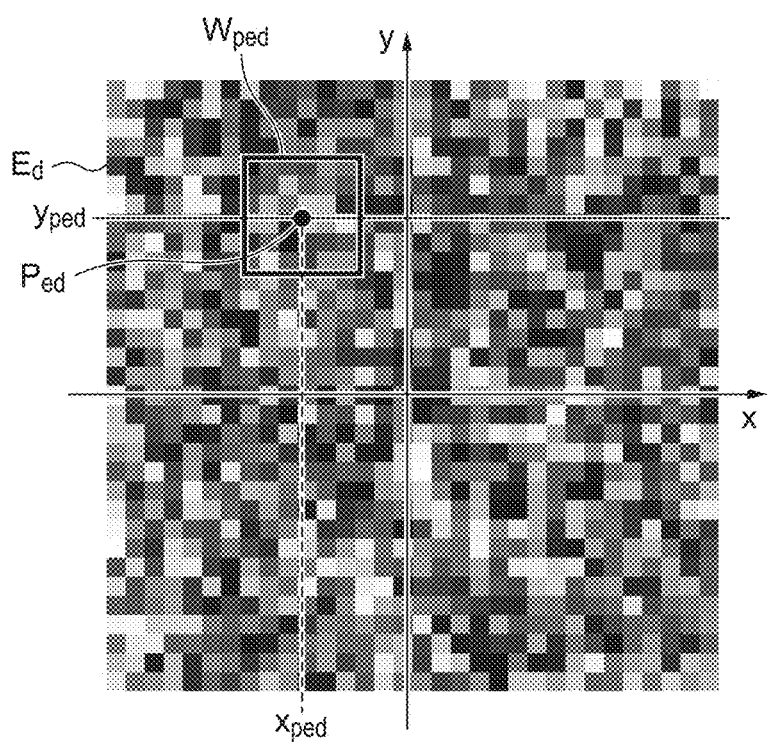

| 1/256 | 4/256 | 6/256 | 4/256 | 1/256 |
| --- | --- | --- | --- | --- |
| 4/256 | 16/256 | 24/256 | 16/256 | 4/256 |
| 6/256 | 24/256 | 36/256 | 24/256 | 6/256 |
| 4/256 | 16/256 | 24/256 | 16/256 | 4/256 |
| 1/256 | 4/256 | 6/256 | 4/256 | 1/256 |

F I G. 21
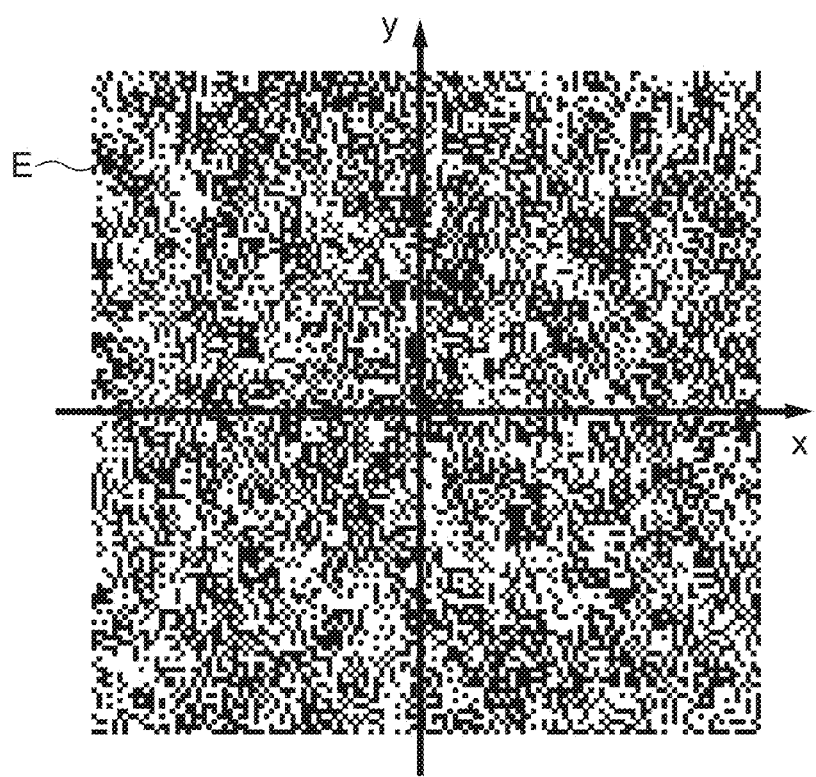

US 9,689,668 B2

IMAGE PROCESSING APPARATUS AND IMAGE PROCESSING METHOD

BACKGROUND OF THE INVENTION

Field of the Invention

The present invention relates to a technique for measuring the three-dimensional shape of an object.

Description of the Related Art

A technique of measuring the three-dimensional shape of an object or the distortion of a surface by projecting a predetermined pattern onto the object and calculating the distortion of the predetermined pattern from a captured image is conventionally implemented. Particularly, there is well known a method capable of measuring the three-dimensional shape of an object or the degree of distortion of a surface by projecting a random pattern onto the object and calculating a local displacement amount by correlation calculation. Under the condition that the position of the object falls outside the imaging range of the pattern, however, a blur occurs in the projected pattern to decrease the contrast, thereby disabling accurate measurement.

To solve this problem, there is proposed an adaptive method of evaluating an image of an object onto which a pattern has been projected, and switching, when it is determined that the pattern is inappropriate, the pattern to another pattern. Japanese Patent Laid-Open No. 2001-147110 describes a method of projecting a pattern onto an object having a texture, evaluating whether the pattern is appropriate, and switching, if the pattern is inappropriate, the pattern to another pattern. This method is applicable to not only the texture of the object but also a blur.

The above conventional technique, however, requires a projection apparatus capable of arbitrarily changing a pattern to be projected, and it is thus necessary to use an expensive image projector with a complicated structure or the like. Furthermore, it takes time to switch a pattern, and the number of images to be shot increases.

SUMMARY OF THE INVENTION

The present invention has been made in consideration of the above problems, and provides a technique for calculating the three-dimensional shape of an object at higher accuracy with a simpler arrangement even under the condition that the object onto which a projection pattern is to be projected falls outside the imaging range of the projection pattern.

According to one aspect of the present invention, there is provided an image processing apparatus comprising: a projection unit configured to project, onto an object, a projection pattern as an image obtained by compositing a first two-dimensional pattern image and a second two-dimensional pattern image; a capturing unit configured to capture the object onto which the projection pattern has been projected; and a measurement unit configured to measure three-dimensional shape information of the object based on the projection pattern projected by the projection unit and an image captured by the capturing unit, wherein when a region formed from at least one pixel is set as a first unit area, and a region having a size larger than that of the first unit area is set as a second unit area, each first unit area of the first two-dimensional pattern image is assigned with one of a plurality of pixel values, and each second unit area of the second two-dimensional pattern image is assigned with one of the plurality of pixel values.

According to another aspect of the present invention, there is provided an image processing method comprising: a projection step of projecting, onto an object, a projection pattern as an image obtained by compositing a first two-dimensional pattern image and a second two-dimensional pattern image; a capturing step of capturing the object onto which the projection pattern has been projected; and a measurement step of measuring three-dimensional shape information of the object based on the projection pattern projected in the projection step and an image captured in the capturing step, wherein when a region formed from at least one pixel is set as a first unit area, and a region having a size larger than that of the first unit area is set as a second unit area, each first unit area of the first two-dimensional pattern image is assigned with one of a plurality of pixel values, and each second unit area of the second two-dimensional pattern image is assigned with one of the plurality of pixel values.

According to still another aspect of the present invention, there is provided an image processing apparatus comprising: a projection unit configured to project a projection pattern onto an object; a capturing unit configured to acquire a captured image by capturing the object onto which the projection pattern has been projected; and a measurement unit configured to measure three-dimensional shape information of the object based on the image captured by the capturing unit, wherein the projection pattern is formed by adding not less than two two-dimensional patterns, and the two-dimensional patterns have different resolutions.

According to yet another aspect of the present invention, there is provided an image processing method comprising: a projection step of projecting a projection pattern onto an object; a capturing step of acquiring a captured image by capturing the object onto which the projection pattern has been projected; and a measurement step of measuring three-dimensional shape information of the object based on the image captured in the capturing step, wherein the projection pattern is formed by adding not less than two two-dimensional patterns, and the two-dimensional patterns have different resolutions.

Further features of the present invention will become apparent from the following description of exemplary embodiments (with reference to the attached drawings).

BRIEF DESCRIPTION OF THE DRAWINGS

FIG. 9 is a view for explaining processing in step S803;

FIG. 10 is a view for explaining processing in step S807;

FIG. 21 is a view showing an example of a projection pattern E.

DESCRIPTION OF THE EMBODIMENTS

Embodiments of the present invention will be described below with reference to the accompanying drawings. Note that the embodiments to be explained below are merely examples when the present invention is practically implemented, and are practical examples of an arrangement set forth in the following claims.

[First Embodiment]

Figure 1:
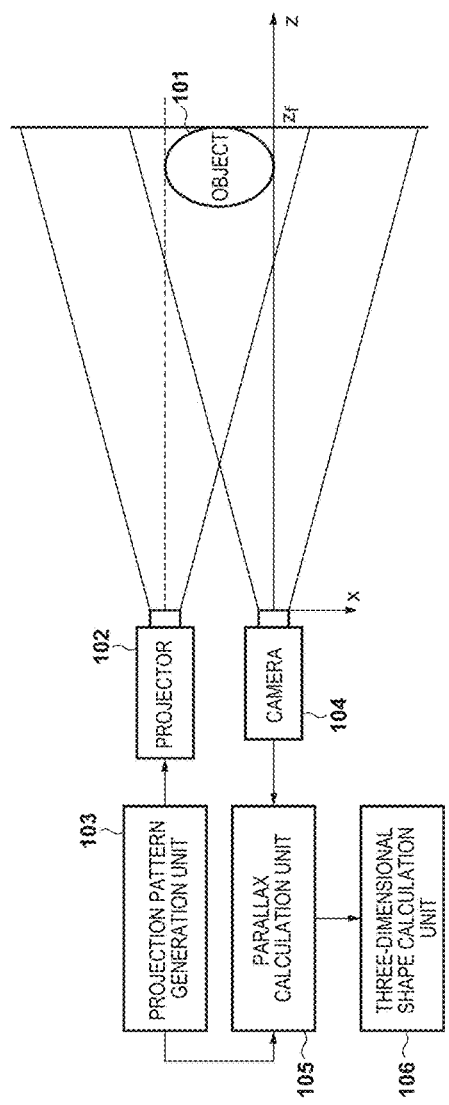
FIG. 1 is a block diagram showing an example of the functional arrangement of an image processing apparatus.

In this embodiment, an image processing apparatus for measuring the three-dimensional shape of a target object having the three-dimensional shape will be described. An example of the functional arrangement of the image processing apparatus according to this embodiment will be explained with reference to a block diagram shown in FIG. 1.

A projector 102 projects a projection pattern generated by a projection pattern generation unit 103 onto an object 101 whose three-dimensional shape is to be measured. When a depth direction along the optical axis of the projector 102 is set as the z-axis direction, the projector 102 projects a projection pattern so that the projection pattern is focused on at a position (farthest position $z_f$) farther than the object 101.

Figure 2:
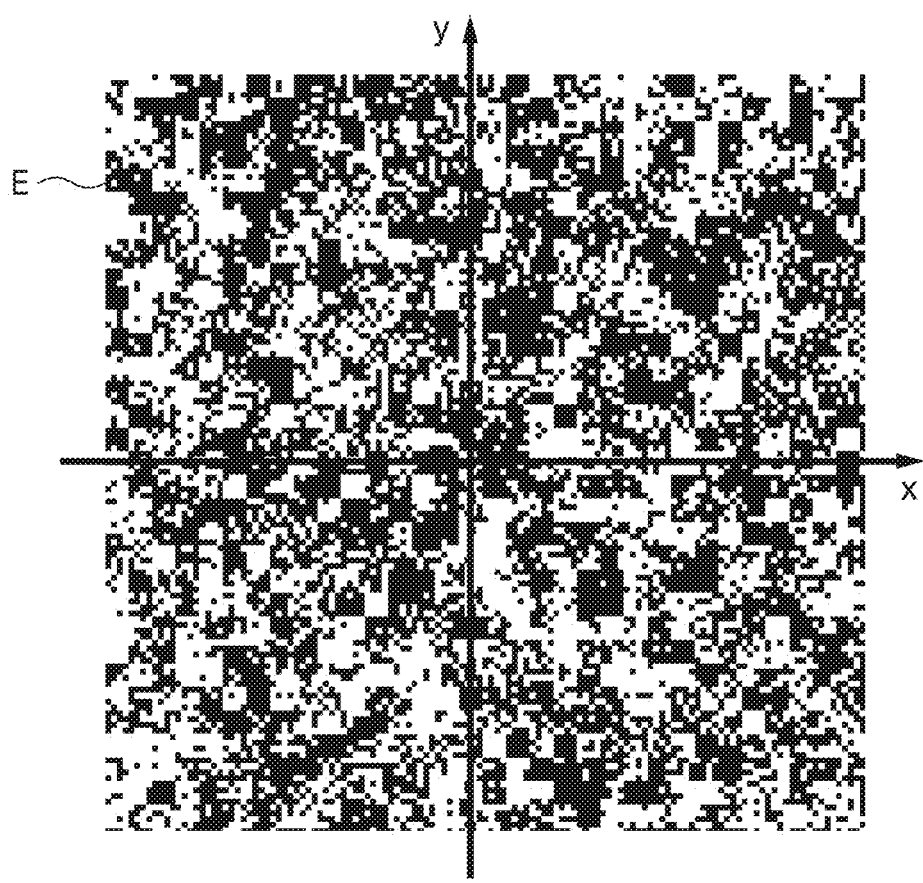
FIG. 2 is a view showing an example of a projection pattern E.

The projection pattern generation unit 103 generates a projection pattern E shown in FIG. 2. As shown in FIG. 2, the projection pattern E is formed by a group of bright points arranged according to a procedure (to be described later), and has a feature that it is possible to satisfactorily detect the auto-correlation peak by randomness and the cross-correlation with an image other than the projection pattern E is low. Furthermore, the projection pattern E has a feature that even if the object 101 falls outside the depth of field of the projector 102 and a blur occurs in the projection pattern E projected onto the object 101, a decrease in contrast is small.

A camera 104 generates a captured image C by capturing the object 101 onto which the projection pattern E has been projected by the projector 102. Note that in this embodiment, in order to facilitate processing, the angle of view of the projector 102 is the same as that of the camera 104 and the image size (resolution) of the projection pattern E is the same as that of the captured image C. The projector 102 and the camera 104 are arranged so that their optical axes are parallel to each other.

A parallax calculation unit 105 performs matching between the projection pattern E on the object 101 in the captured image C and the projection pattern E generated by the projection pattern generation unit 103, thereby calculating a parallax, on the object 101, which is generated between the projector 102 and the camera 104.

A three-dimensional shape calculation unit 106 calculates the depth (three-dimensional shape) of the object 101 observed from the camera 104 by using the parallax calculated by the parallax calculation unit 105, the length (baseline length) of the baseline between the projector 102 and the camera 104, and the focal length of the camera 104.

Figure 3:
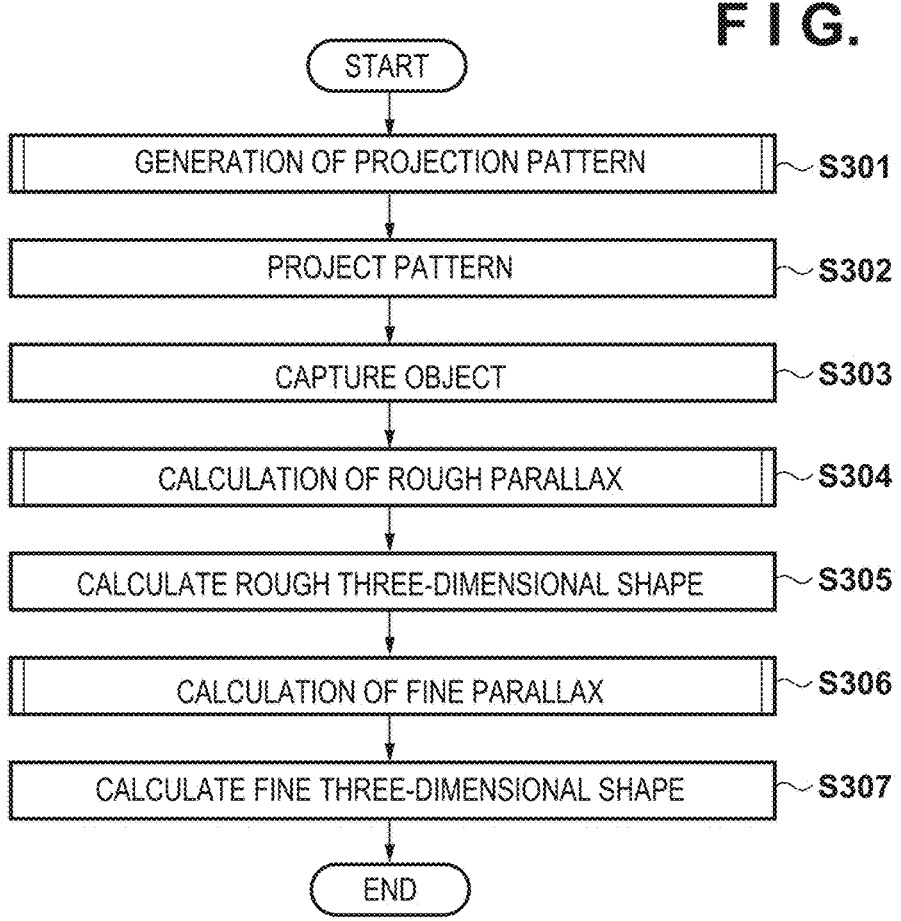
FIG. 3 is a flowchart illustrating processing executed by the image processing apparatus.

Processing executed by the image processing apparatus according to this embodiment to calculate the three-dimensional shape of the object 101 will be described with reference to FIG. 3 which shows a flowchart illustrating the processing.

<Step S301>

Figure 4:
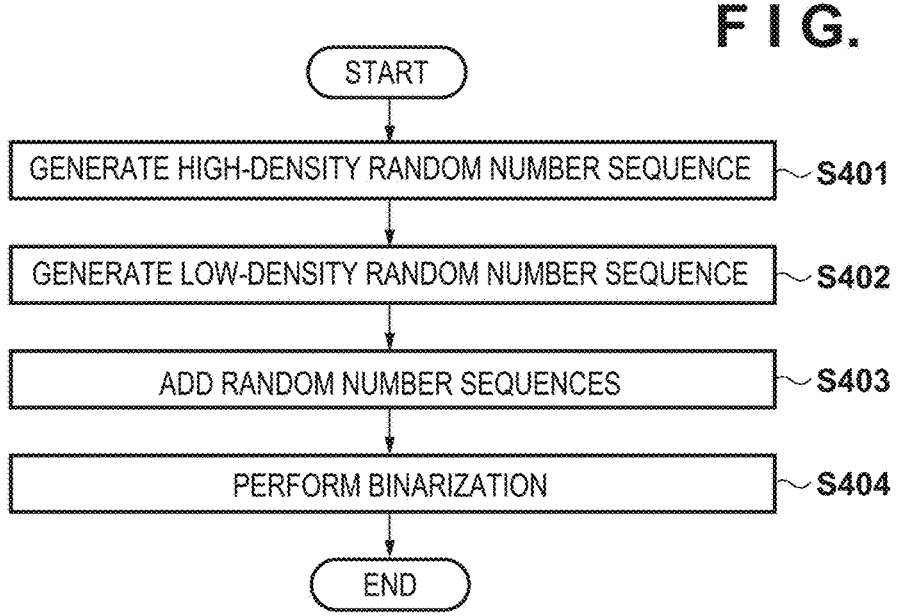
FIG. 4 is a flowchart illustrating details of processing in step S301.

The projection pattern generation unit 103 generates the projection pattern E as a composite image obtained by compositing the first two-dimensional pattern image and the second two-dimensional pattern image (having the same image size (resolution) as that of the first two-dimensional pattern image). The processing in step S301 will be described in detail with reference to a flowchart shown in FIG. 4.

<Step S401>

Figure 5:
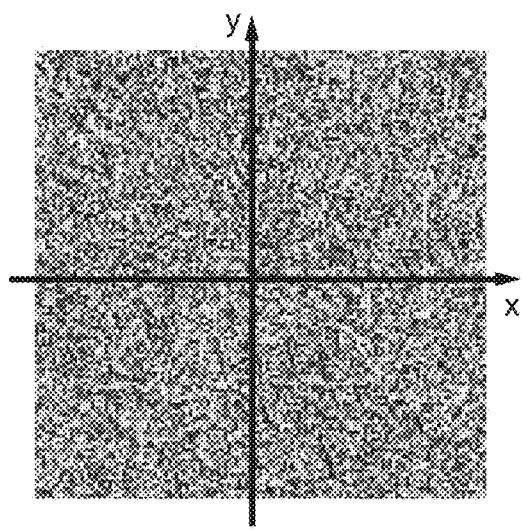
FIG. 5 is a view showing an example of the first two-dimensional pattern image.

The projection pattern generation unit 103 generates, as a high-density random number sequence Rh, a two-dimensional array with the number of elements which is equal to that of pixels of the projection pattern E. For example, when px represents the number of pixels in the x direction (horizontal direction) of the projection pattern E and py represents the number of pixels in the y direction (vertical direction) of the projection pattern E, the high-density random number sequence Rh is a two-dimensional array of px (horizontal direction)×py (vertical direction). Also, the high-density random number sequence Rh is a two-dimensional array in which each element has a value randomly selected from 0 to 255. FIG. 5 shows an image (the first two-dimensional pattern image) expressing the high-density random number sequence Rh using the value of each element of the high-density random number sequence Rh as a pixel value (to be referred to as a luminance value hereinafter).

<Step S402>

The projection pattern generation unit 103 generates, as a low-density random number sequence Rl, a two-dimensional array having the number of elements which is equal to 1/16 of the number of pixels of the projection pattern E. For example, when px represents the number of pixels in the x direction (horizontal direction) of the projection pattern E and py represents the number of pixels in the y direction (vertical direction) of the projection pattern E, the low-density random number sequence Rl is a two-dimensional array of px/4 (horizontal direction)×py/4 (vertical direction). The low-density random number sequence Rl is a two-dimensional array in which each element has a value randomly selected from 0 to 255.

<Step S403>

The projection pattern generation unit 103 generates a two-dimensional composite random number sequence $R_a$ by compositing the high-density random number sequence Rh generated in step S401 and the low-density random number sequence Rl generated in step S402. Let $r_{lxy}$ be a value at a position (x, y) in the low-density random number sequence Rl and $r_{hxy}$ be a value at the position (x, y) in the high-density random number sequence Rh. Then, a value $r_{axy}$ at the position (x, y) in the composite random number sequence $R_a$ is given by:

$$r_{axy} = (r_{hxy} + r_{l(\frac{x}{4}\frac{y}{4})}) \qquad (1)$$

Figure 6:
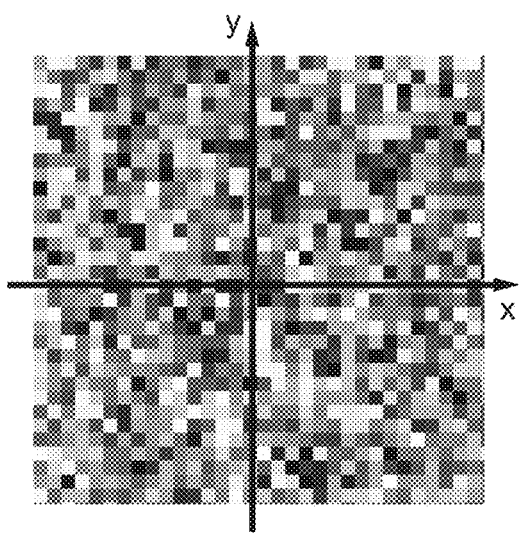
FIG. 6 is a view showing an example of the second two-dimensional pattern image.

As described above, it is understood that the second two-dimensional pattern image is an image in which a pixel value at the pixel position (x, y) in the second two-dimensional pattern image is $r_{l(x/4)(y/4)}$. FIG. 6 shows the second two-dimensional pattern image.

Figure 7:
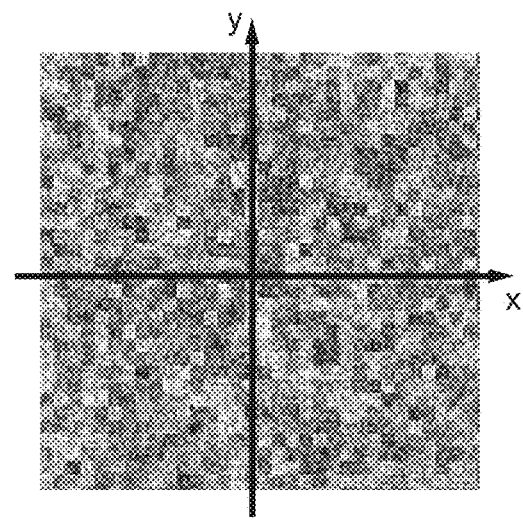
FIG. 7 is a view showing an example of an image having, as a pixel value, the value of each element of a composite random number sequence $R_d$.

By performing calculation according to equation (1) for all the values x and y on the high-density random number sequence Rh, therefore, it is possible to generate the composite random number sequence $R_a$ in which each element has one of values 0 to 510 and which has the same image size (resolution) as that of the high-density random number sequence Rh. FIG. 7 shows an image having the value of each element of the composite random number sequence $R_a$ as a pixel value (luminance value).

Note that the first two-dimensional pattern image and the second two-dimensional pattern image are not limited to the aforementioned examples. That is, the first two-dimensional pattern image and the second two-dimensional pattern image may take any forms as follows.

That is, a rectangular region formed from one or a plurality of pixels is set as the first unit area, and a rectangular region having a size larger than that of the above rectangular region is set as the second unit area. In this case, one of a plurality of pixel values is assigned to each first unit area of the first two-dimensional pattern image, and one of the plurality of pixel values is assigned to each second unit area of the second two-dimensional pattern image.

<Step S404>

The projection pattern generation unit 103 binarizes the value of each element of the composite random number sequence. In this binarization processing, a threshold is set to 255. Among the values of the respective elements of the composite random number sequence, a value equal to or smaller than 255 is modified to 0, and a value exceeding 255 is modified to 255. This sets the value of each element forming the composite random number sequence to 0 or 255, thereby setting the composite random number sequence as the projection pattern E.

<Step S302>

The projector 102 projects the projection pattern E generated by the projection pattern generation unit 103 in step S301 onto the object 101. As described above, an in-focus position at which the projection pattern E is projected without blurring is set at the possible farthest position $z_f$ of the object 101 in the z direction. As the z position of the object 101 is closer to the camera 104, the blur amount of the projection pattern E on the object 101 increases.

<Step S303>

Figure 13:
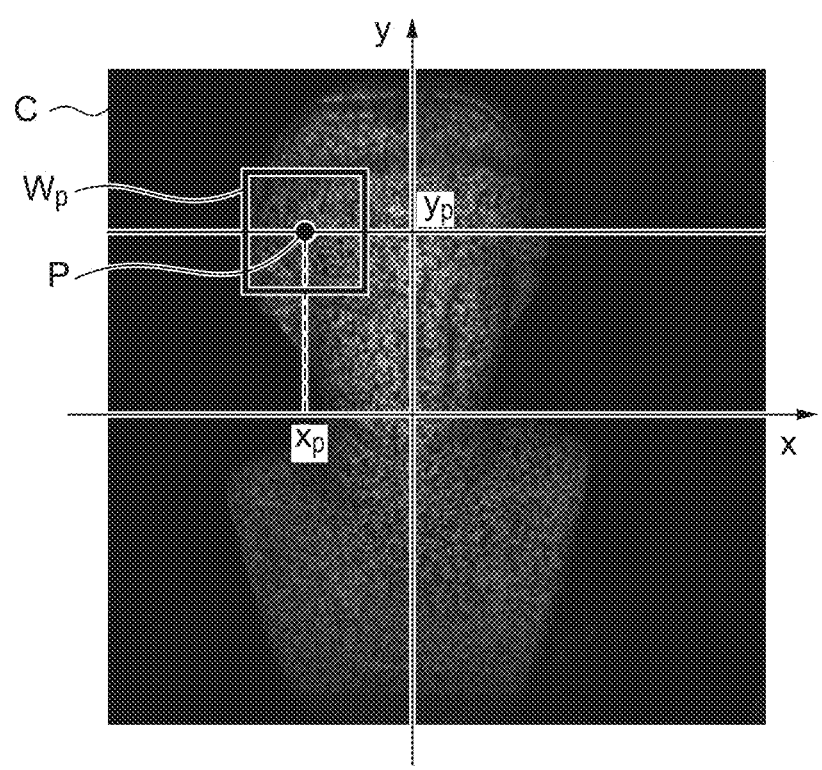
FIG. 13 is a view showing an example of a captured image C.

The camera 104 captures the object 101 onto which the projection pattern E has been projected, and acquires the captured image C having a luminance value of the gray scale within the range from 0 to 255 at each pixel, as exemplified in FIG. 13.

<Step S304>

The parallax calculation unit 105 calculates a parallax on the object 101 between the projector 102 and the camera 104 using the captured image C acquired in step S303 and the projection pattern E generated in step S301 in a unit rougher than the resolution of the captured image C, thereby generating a rough parallax image Dd. The processing in step S304 will be described in detail with reference to a flowchart shown in FIG. 8.

<Step S801>

The parallax calculation unit 105 generates a reduced image $C_d$ of the captured image C and a reduced projection pattern $E_d$ as a reduced image of the projection pattern E. The size of the reduced image is ¼ the size of the original image. In image reduction processing, adjacent pixels are sampled by linear interpolation, and aliasing is suppressed.

<Step S802>

A pixel at a pixel position in the reduced image $C_d$, which has not been processed yet, is set as a pixel $P_d$ for which a parallax is to be calculated. In step S802 for the first time, a pixel at the upper left corner position of the reduced image $C_d$ is set as the pixel $P_d$. In step S802 for the second time, a pixel at the right adjacent pixel position of the upper left corner position is set as the pixel $P_d$. In this way, the respective pixels from the upper left corner position to the lower right corner position of the reduced image $C_d$ are sequentially set as the pixel $P_d$.

<Step S803>

As shown in FIG. 9, a rectangular region of 11 pixels×11 pixels centered on the pixel $P_d$ is set as a reduced image window $W_{pd}$. Note that if the reduced image window $W_{pd}$ is set near the edge portion of the reduced image $C_d$, the outside portion of the reduced image $C_d$ is included in the reduced image window $W_{pd}$. In this case, the outside portion is considered to have a luminance value=0.

<Step S804>

A variable $R_{pdmin}$ is initialized by a maximum evaluation value $R_{max}$ as a possible maximum value.

<Step S805>

A variable $X_{pdmin}$ is initialized by the x-coordinate value of the pixel position at which the pixel $P_d$ has been set in step S802. In the case of FIG. 9, since the x-coordinate value at a pixel position $(x_{pd}, y_{pd})$ at which the pixel $P_d$ has been set is "$x_{pd}$", the variable $X_{pdmin}$ is initialized by the value $x_{pd}$.

<Step S806>

In the reduced projection pattern $E_d$, a pixel $P_{ed}$ corresponding to the pixel $P_d$ is set on a line with a y-coordinate value=$y_{ped}$. Based on the positional relationship between the projector 102 and the camera 104, the possible range of the pixel $P_{ed}$ is limited to a line with a y-coordinate value $y_{ped}$ ($y_{ped}=y_{pd}$) on the projection pattern, which corresponds to the y-coordinate value $y_{pd}$ of the pixel $P_d$. In step S806 for the first time, the pixel $P_{ed}$ is set at a pixel position (0, $y_{ped}$). In step S806 for the second time, the pixel $P_{ed}$ is set at a pixel position (1, $y_{ped}$). In this way, the respective pixels from the left end to the right end of the line with the y-coordinate value $y_{ped}$ in the reduced projection pattern $E_d$ are sequentially set as the pixel $P_{ed}$.

<Step S807>

As shown in FIG. 10, a rectangular region of 11 pixels×11 pixels centered on the pixel $P_{ed}$ is set as a reduced evaluation window $W_{ped}$. Note that if the reduced evaluation window $W_{ped}$ is set near the edge portion of the reduced projection pattern $E_d$, the outside portion of the reduced projection pattern $E_d$ is included in the reduced evaluation window $W_{ped}$. In this case, the outside portion is considered to have a luminance value=0.

<Step S808>

The difference between the luminance value of a pixel at each pixel position in the reduced image window $W_{pd}$ and that of a pixel at the same pixel position in the reduced evaluation window $W_{ped}$ is calculated, thereby calculating the total of the differences at the respective pixel positions as an evaluation value $R_{ped}$. For example, the evaluation value $R_{ped}$ can be obtained by:

$$R_{ped} = \sum_{x_w} (I_{wpd}(x_w) - I_{wped}(x_w))^2 \qquad (2)$$

where $I_{wpd}(x_w)$ represents a luminance value at a pixel position $x_w$ within the reduced image window $W_{pd}$, and $I_{wped}(x_w)$ represents a luminance value at the pixel position $x_w$ within the reduced evaluation window $W_{ped}$. According to equation (2), the square of the difference between the pixel values is calculated for each pixel position $x_w$ within the reduced image window $W_{pd}$ (reduced evaluation window $W_{ped}$), thereby obtaining, as the evaluation value $R_{ped}$, the total of the square values calculated for the respective pixel positions $x_w$.

<Step S809>

The magnitude of the evaluation value $R_{ped}$ obtained in step S808 is compared with that of the minimum evaluation value as the value of the variable $R_{pdmin}$. If $R_{pdmin} > R_{ped}$, the process advances to step S810; otherwise, the process advances to step S812.

<Step S810>

The evaluation value $R_{ped}$ is substituted for the variable $R_{pdmin}$.

<Step S811>

An x-coordinate position $x_{ped}$ of the current pixel $P_{ed}$ is substituted for the variable $X_{pdmin}$.

<Step S812>

If the x-coordinate position of the pixel $P_{ed}$ reaches the right end position of the line with the y-coordinate value=$y_{ped}$, the process advances to step S813; otherwise, the current x-coordinate position of the pixel $P_{ed}$ is incremented by one, and then the process returns to step S806.

<Step S813>

The magnitude of the minimum evaluation value as the value of the variable $R_{pdmin}$ is compared with that of a predetermined reference evaluation value $R_{refd}$. If $R_{pdmin} < R_{refd}$, it is determined that the minimum evaluation value is a reliable evaluation value, and the process advances to step S814. That is, as the minimum evaluation value is smaller, the similarity between the luminance values is higher with respect to the pixel group within the reduced image window $W_{pd}$ and the pixel group within the reduced evaluation window $W_{ped}$. On the other hand, if $R_{pdmin} \geq R_{refd}$, it is determined that the minimum evaluation value is an unreliable evaluation value, and the process advances to step S815.

<Step S814>

The difference between the x-coordinate position $x_{pd}$ of the pixel $P_d$ and the x-coordinate position expressed by the variable $X_{pdmin}$ is obtained as a parallax $d_{pd}$ at the pixel $P_d$.

<Step S815>

As the parallax $d_{pd}$ at the pixel $P_d$, NaN is set. After that, the parallax $d_{pd}$ at the pixel $P_d$ is considered not to be calculated, and will not be used in subsequent calculation.

<Step S816>

It is determined whether the processes in steps S802 to S815 have been performed for all the pixels of the reduced image $C_d$. If it is determined that the processes in steps S802 to S815 have been performed for all the pixels of the reduced image $C_d$, the process advances to step S305. On the other hand, if, among the pixels of the reduced image $C_d$, a pixel for which the processes in steps S802 to S815 have not been performed yet remains, the process returns to step S802.

Figure 8:
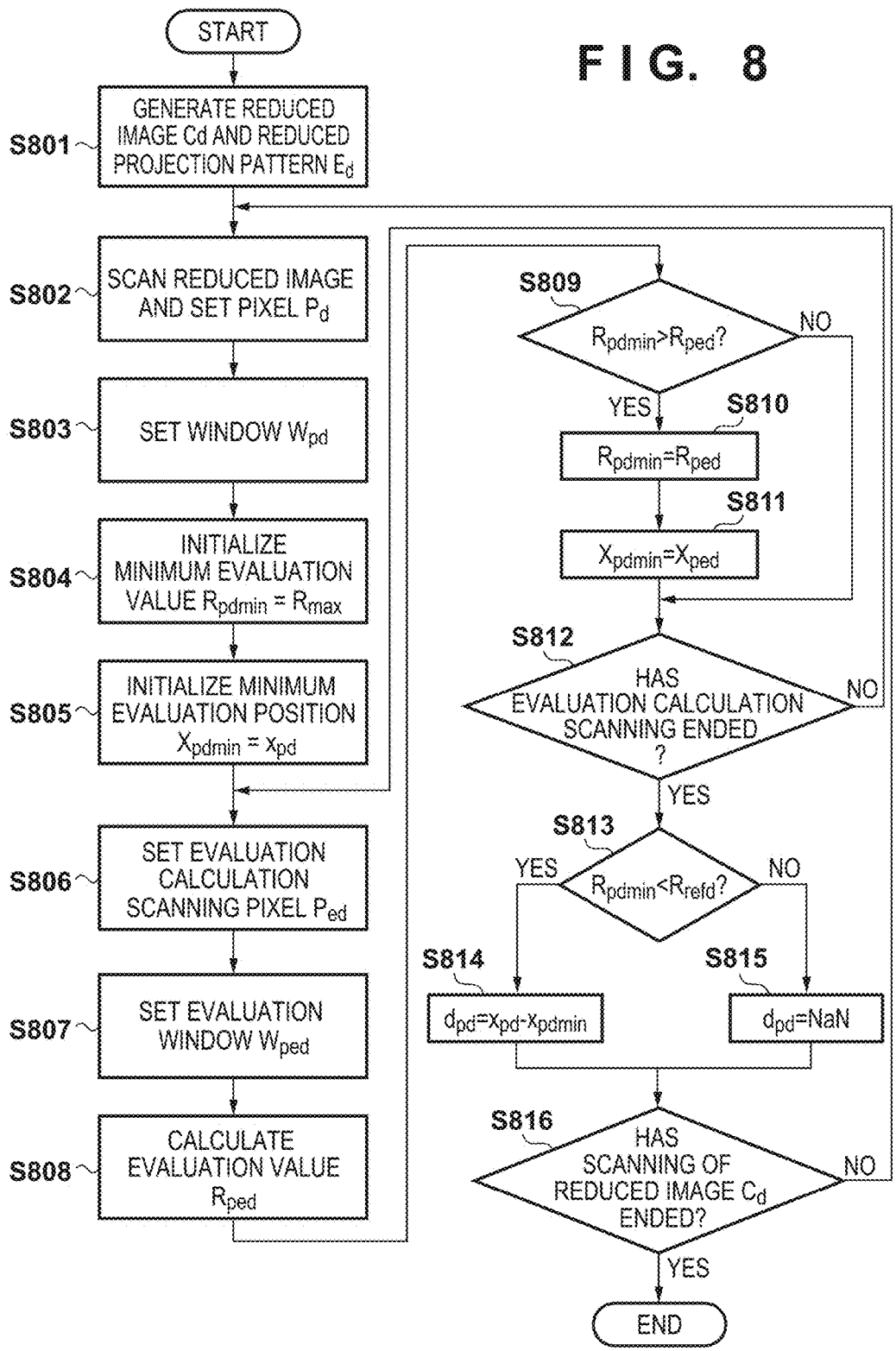
FIG. 8 is a flowchart illustrating details of processing in step S304.

By executing the processing according to the flowchart shown in FIG. 8 described above, it is possible to calculate the parallax $d_{pd}$ for each pixel of the reduced image $C_d$. The parallax calculation unit 105 generates the rough parallax image Dd by aligning the corresponding parallaxes $d_{pd}$ according to the arrangement of the pixels of the reduced image $C_d$. That is, the value (parallax $d_{pd}$) at the pixel position (x, y) in the rough parallax image Dd represents a parallax corresponding to the pixel at the pixel position (x, y) in the reduced image $C_d$.

<Step S305>

The three-dimensional shape calculation unit 106 obtains the rough three-dimensional shape of the object 101 using the rough parallax image Dd generated in step S304, the length (baseline length) of the baseline between the projector 102 and the camera 104 (to be described later), and the focal length of the camera 104.

Figure 11:
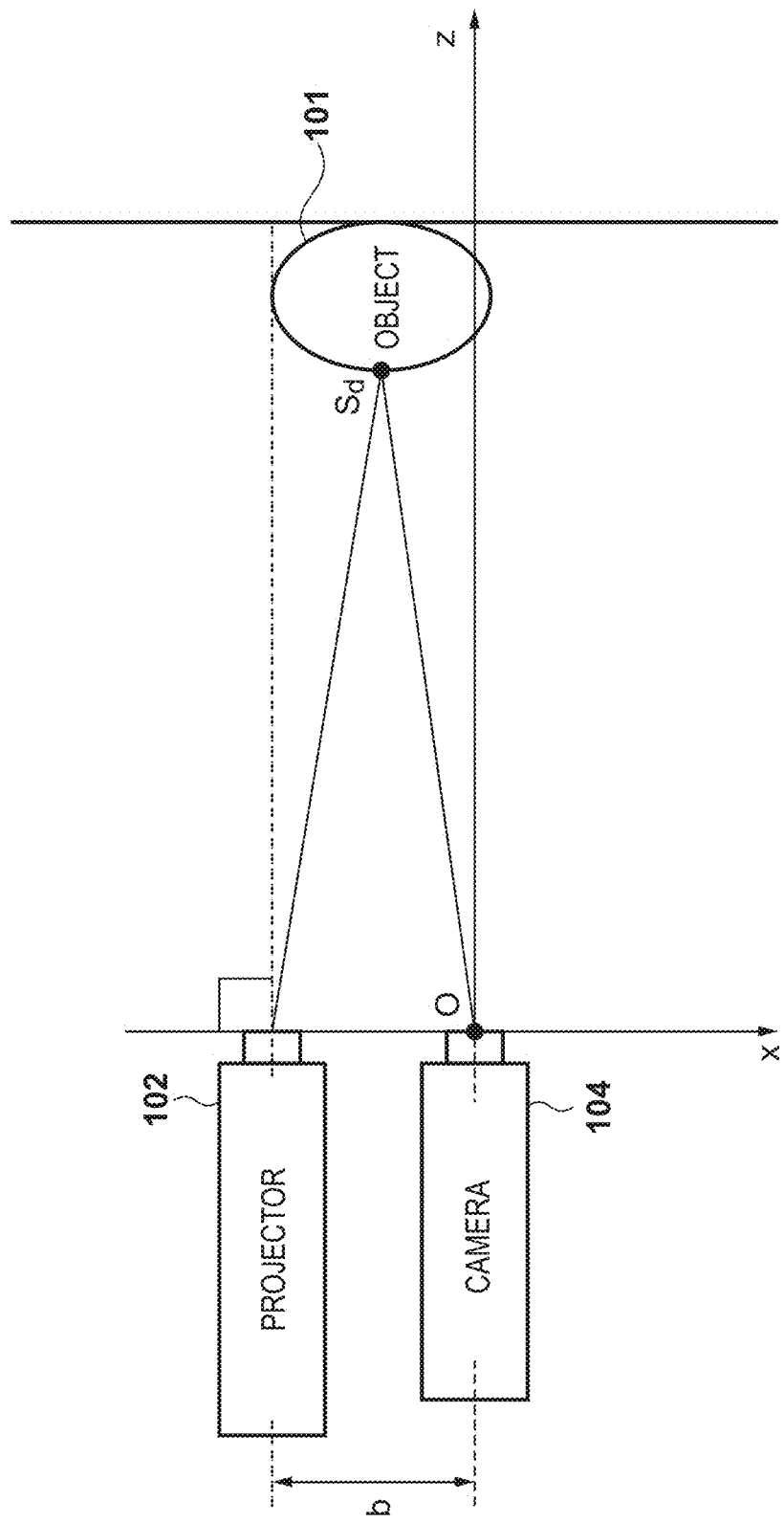
FIG. 11 is a schematic view showing the simplified positional relationship between a projector 102, a camera 104, and a point $s_d$.

FIG. 11 is a schematic view showing the simplified positional relationship between the projector 102, the camera 104, and a point $s_d$ on the object 101. As a coordinate system for expressing a three-dimensional shape measurement result, a space coordinate system in which the z direction indicating the depth is set in the optical axis direction having the principal point of the camera 104 as an origin o in addition to the same x and y directions as those of the captured image is defined. Assume that the principal point of the camera 104 is away from that of the projector 102 by a baseline length b, and a straight line connecting the principal points forms a right angle with the visual axis of each of the projector 102 and the camera 104.

Consider a case in which an arbitrary point $s_d(x_{sd}, y_{sd}, z_{sd})$ on the object 101 is observed using the camera 104 in this space coordinate system. If the point $s_d$ is observed at a position $sc(x_{sc}, y_{sc})$ in the captured image, the space coordinates $(x_{sd}, y_{sd}, z_{sd})$ of the point $s_d$ are given by:

$$\begin{cases} x_{sd} = kx_{sc}/f \\ y_{sd} = ky_{sc}/f \\ z_{sd} = k/f \end{cases} \qquad (3)$$

where f represents the focal length of the camera 104, and k represents a parameter. When the coordinate position at the point $s_d$ of the projection pattern projected by the projector 102 is indicated by $sp(x_{sp}, y_{sp})$, $y_{sc} = y_{sp}$, and the parallax obtained for the point $s_d$ in step S304 indicates the difference between $x_{sc}$ and $x_{sp}$. By using the parallax $d_{sc}$ corresponding to the point sc in the rough parallax image Dd, the depth $z_{sd}$ of the point $s_d$ is given by:

$$z_{sd} = b \cdot f / d_{sc} \qquad (4)$$

By eliminating the parameter k using equations (3) and (4), the coordinates $(x_{sd}, y_{sd}, z_{sd})$ of the point $s_d$ in the three-dimensional space can be obtained by:

$$\begin{cases} x_{sd} = x_{sc} \cdot b \cdot f / d_{sc} \\ y_{sd} = y_{sc} \cdot b \cdot f / d_{sc} \\ z_{sd} = b \cdot f / d_{sc} \end{cases} \qquad (5)$$

Consequently, it is possible to obtain a rough distance image $S_d$ representing the rough three-dimensional shape of the object 101 by calculating the three-dimensional coordinate position of the point $s_d$ with respect to each pixel other than pixels each having the value NaN among the respective pixels forming the rough parallax image Dd.

<Step S306>

The parallax calculation unit 105 calculates, in detail, the parallax between the projector 102 and the camera 104 on the object 101 using the projection pattern E, the captured image C, and the rough distance image $S_d$ for each pixel of the captured image C, thereby generating a fine parallax image Df having the parallax of each pixel as a pixel value. The processing in step S306 will be described in detail with reference to a flowchart shown in FIG. 12.

<Step S1201>

First, up-sampling processing is applied to the rough distance image $S_d$ to generate an enlarged distance image Su having the same size as that of the captured image C. In the up-sampling processing, sampling is performed by nearest neighbor pixels without performing interpolation for adjacent pixel values.

<Step S1202>

A pixel at a pixel position in the captured image C, which has not been processed yet, is set as a pixel p for which a parallax is to be calculated. In step S1202 for the first time, a pixel at the upper left corner position of the captured image C is set as the pixel p. In step S1202 for the second time, a pixel at the right adjacent pixel position of the upper left corner position is set as the pixel p. In this way, the respective pixels from the upper left corner position to the lower right corner position of the captured image C are sequentially set as the pixel p.

<Step S1203>

As shown in FIG. 13, a rectangular region of 11 pixels×11 pixels centered on the pixel p is set as a captured image window $W_p$. Note that if the captured image window $W_p$ is set near the edge portion of the captured image C, the outside portion of the captured image C is included in the captured image window $W_p$. In this case, the outside portion is considered to have a luminance value=0.

<Step S1204>

A variable $R_{pmin}$ is initialized by the maximum evaluation value $R_{max}$ as a possible maximum value.

<Step S1205>

A variable $X_{pmin}$, is initialized by the x-coordinate value of the pixel position at which the pixel p has been set in step S1202. In the case of FIG. 13, since the x-coordinate value at a pixel position $(x_p, y_p)$ at which the pixel p has been set is "$x_p$", the variable $X_{pmin}$, is initialized by the value $x_p$.

<Step S1206>

A projection pattern En for which a window is to be set is decided using the enlarged distance image Su generated in step S1201 and the projection pattern E in order to perform similarity comparison with the captured image window $W_p$.

Figure 14:
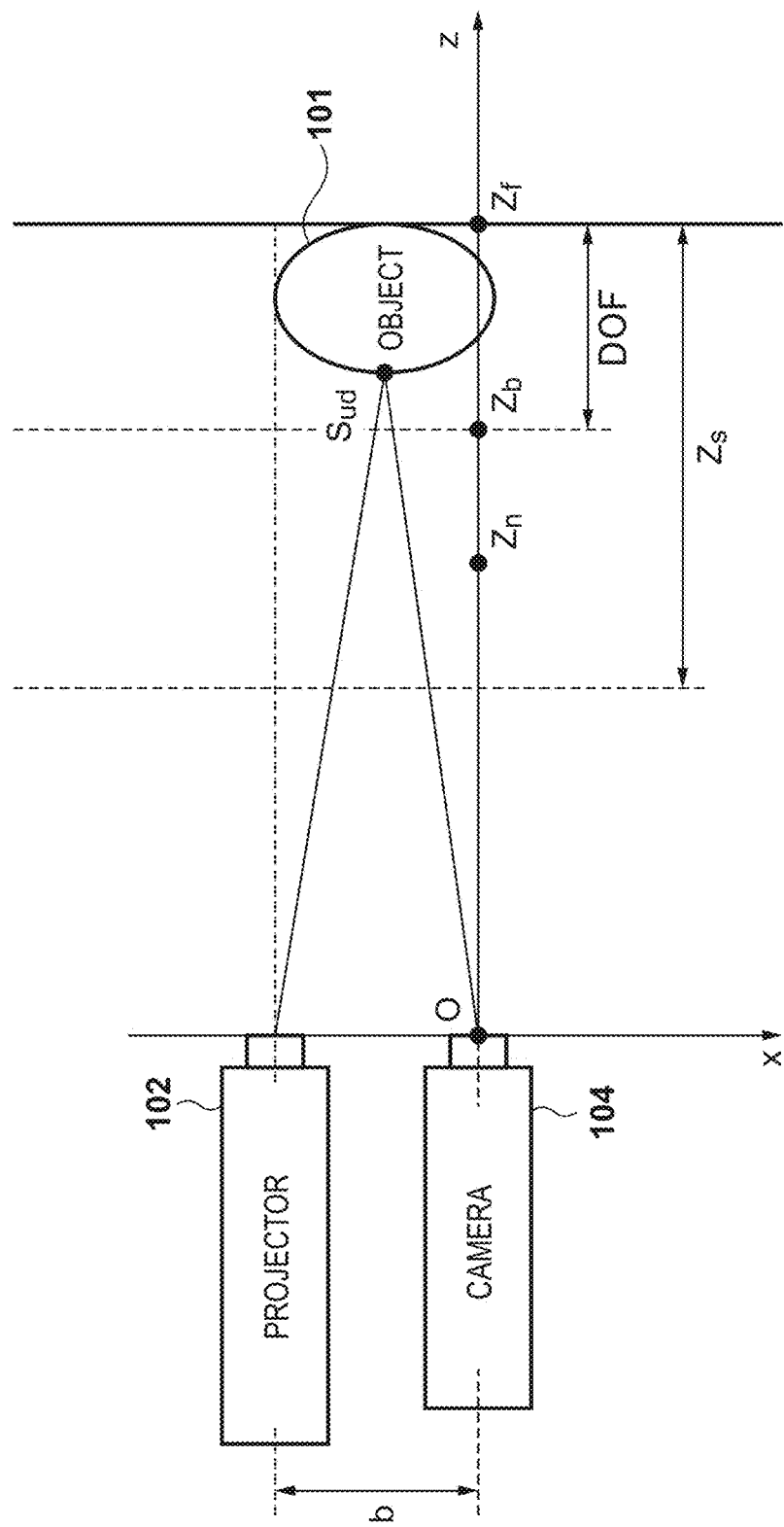
FIG. 14 is a view showing the relationship between the depth of field of the projector 102 and the position of an object 101.

As shown in FIG. 14, when the z position of a point $S_{ud}$ on the object 101 falls within a depth of field DOF of the projector 102 (the range from a closest boundary position $z_b$ to the farthest position $z_f$), the projection pattern E projected on the object 101 forms an image without blurring. As described above, if the z position of the point $S_{ud}$ within the enlarged distance image Su, which corresponds to the pixel p, falls within the range of the depth of field DOF, the projection pattern E is set as the projection pattern En.

Figures 15, 16:
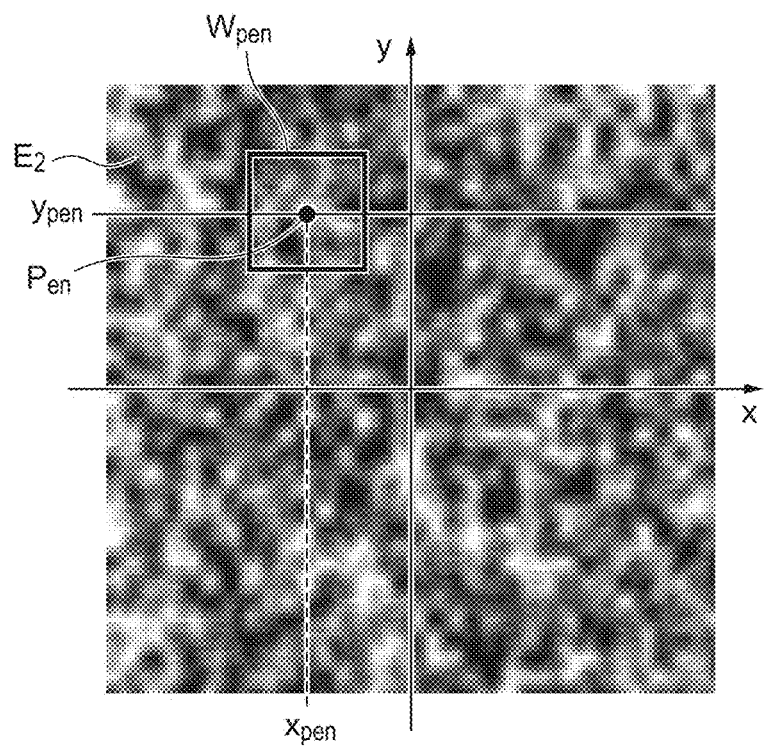
FIG. 15 is a view showing the result of performing Gaussian filtering for the projection pattern E.
FIG. 16 is a view showing an example of the arrangement of a filter.

On the other hand, if the z position of the point $S_{ud}$ falls outside the depth of field DOF (for example, the z position exists before the closest boundary position $z_b$), the projection pattern E is captured in a blurred state. If the projection pattern within the window for which similarity calculation with the captured image window $W_p$ set within the captured image C is performed is sharp without blurring while the projection pattern within the captured image C blurs, the accuracy of matching between the windows deteriorates. In this embodiment, therefore, if the projection pattern within the captured image C blurs, the projection pattern within the window for which similarity calculation with the captured image window $W_p$ set within the captured image C is performed is accordingly blurred. To do this, if the z position of the point $S_{ud}$ falls outside the depth of field DOF, a projection pattern obtained by performing Gaussian filtering for the projection pattern E is generated as the projection pattern $E_n$. FIG. 15 shows an example of the projection pattern obtained by performing Gaussian filtering for the projection pattern.

Gaussian filtering is a kind of convolution filtering for reproducing a blurred state. In step S1206, convolution calculation by a 5×5 filter shown in FIG. 16 is performed for the projection pattern E. In this embodiment, when the existence range of the object 101 is represented by $Z_s$, as shown in FIG. 14, each numerical value of the filter is set so that the blur amount becomes equal to that when the projection pattern E is projected onto an intermediate position $z_n$ corresponding to the midpoint of the difference between the depth of field DOF and the existence range $Z_s$.

As described above, the pixel value of each pixel of the enlarged distance image Su is referred to. If a distance expressed by the pixel value of the pixel falls within the depth of field of the projector 102, the projection pattern E is set as the projection pattern $E_n$ for the pixel. On the other hand, if the distance falls outside the depth of field, a projection pattern obtained by performing Gaussian filtering for the projection pattern E is set as the projection pattern $E_n$. In this way, for each pixel of the enlarged distance image Su (captured image C), one of the projection pattern E and the projection pattern obtained by performing Gaussian filtering for the projection pattern E is decided as a projection pattern to be used for the pixel.

<Step S1207>

In the projection pattern $E_n$, a pixel $P_{en}$ corresponding to the above-described pixel p is set on a line with a y-coordinate value=$y_{pen}$. Based on the positional relationship between the projector 102 and the camera 104, the possible range of the pixel $P_{en}$ is limited to a line with the y-coordinate value $y_{pen}$ ($y_{pen}$=$y_p$) on a projection pattern, which corresponds to the y-coordinate value $y_p$ of the pixel p. In step S1207 for the first time, the pixel $P_{en}$ is set at a pixel position (0, $y_{pen}$). In step S1207 for the second time, the pixel $P_{en}$ is set at a pixel position (1, $y_{pen}$). In this way, in the projection pattern $E_n$, the respective pixels from the left end to the right end of the line with the y-coordinate value=$y_{pen}$ are sequentially set as the pixel $P_{en}$.

<Step S1208>

As shown in FIG. 15, a rectangular region of 11 pixels×11 pixels centered on the pixel $P_{en}$ is set as an evaluation window $W_{pen}$. Note that if the evaluation window $W_{pen}$ is set near the edge portion of the projection pattern $E_n$, the outside portion of the projection pattern $E_n$ is included in the evaluation window $W_{pen}$. In this case, the outside portion is considered to have a luminance value=0.

<Step S1209>

The difference between the luminance value of a pixel at each pixel position in the captured image window $W_p$ and that of a pixel at the same pixel position in the evaluation window $W_{pen}$ is calculated, thereby calculating the total of the differences at the respective pixel positions as an evaluation value $R_{pen}$. For example, the evaluation value $R_{pen}$ can be obtained by:

$$R_{pen} = \sum_{x_w} (I_{wp}(x_w) - I_{wpen}(x_w))^2 \quad (6)$$

where $I_{wp}(x_w)$ represents a luminance value at the pixel position $x_w$ within the captured image window $W_p$, and $I_{wpen}(x_w)$ represents a luminance value at the pixel position $x_w$ within the evaluation window $W_{pen}$. According to equation (6), the square of the difference between the pixel values is calculated for each pixel position $x_w$ within the captured image window $W_p$ (evaluation window $W_{pen}$), thereby obtaining, as the evaluation value $R_{pen}$, the total of the square values calculated for the respective pixel positions $x_w$.

<Step S1210>

The magnitude of the evaluation value $R_{pen}$ obtained in step S1209 is compared with that of the minimum evaluation value as the value of the variable $R_{pmin}$. If $R_{pmin} > R_{pen}$, the process advances to step S1211; otherwise, the process advances to step S1213.

<Step S1211>

The evaluation value $R_{pen}$ is substituted for the variable $R_{pmin}$.

<Step S1212>

An x-coordinate position $x_{pen}$ of the current pixel $P_{en}$ is substituted for the variable $X_{pmin}$.

<Step S1213>

If the x-coordinate position of the pixel $P_{en}$ reaches the right end position of the line with the y-coordinate=$y_{pen}$, the process advances to step S1214; otherwise, the current x-coordinate position of the pixel $P_{en}$ is incremented by one, and then the process returns to step S1207.

<Step S1214>

The magnitude of the minimum evaluation value as the value of the variable $R_{pmin}$ is compared with that of a predetermined reference evaluation value $R_{ref}$. If $R_{pmin} < R_{ref}$, it is determined that the minimum evaluation value is a reliable evaluation value, and the process advances to step S1215. That is, as the minimum evaluation value is smaller, the similarity between the luminance values is higher with respect to the pixel group within the captured image window $W_p$ and the pixel group within the evaluation window $W_{pen}$. On the other hand, if $R_{pmin} \geq R_{ref}$, it is determined that the minimum evaluation value is an unreliable evaluation value, and the process advances to step S1216.

<Step S1215>

The difference between an x-coordinate position $x_p$ of the pixel p and the x-coordinate position expressed by the variable $X_{pmin}$ is obtained as a parallax $d_p$ at the pixel p.

<Step S1216>

As the parallax $d_p$ at the pixel p, NaN is set. After that, the parallax $d_p$ at the pixel p is considered not to be calculated, and will not be used in subsequent calculation.

<Step S1217>

It is determined whether the processes in steps S1202 to S1216 have been performed for all the pixels of the captured image C. If it is determined that the processes in steps S1202 to S1216 have been performed for all the pixels of the captured image C, the process advances to step S307. On the other hand, if, among the pixels of the captured image C, a pixel for which the processes in steps S1202 to S1216 have not been performed yet remains, the process returns to step S1202.

Figure 12:
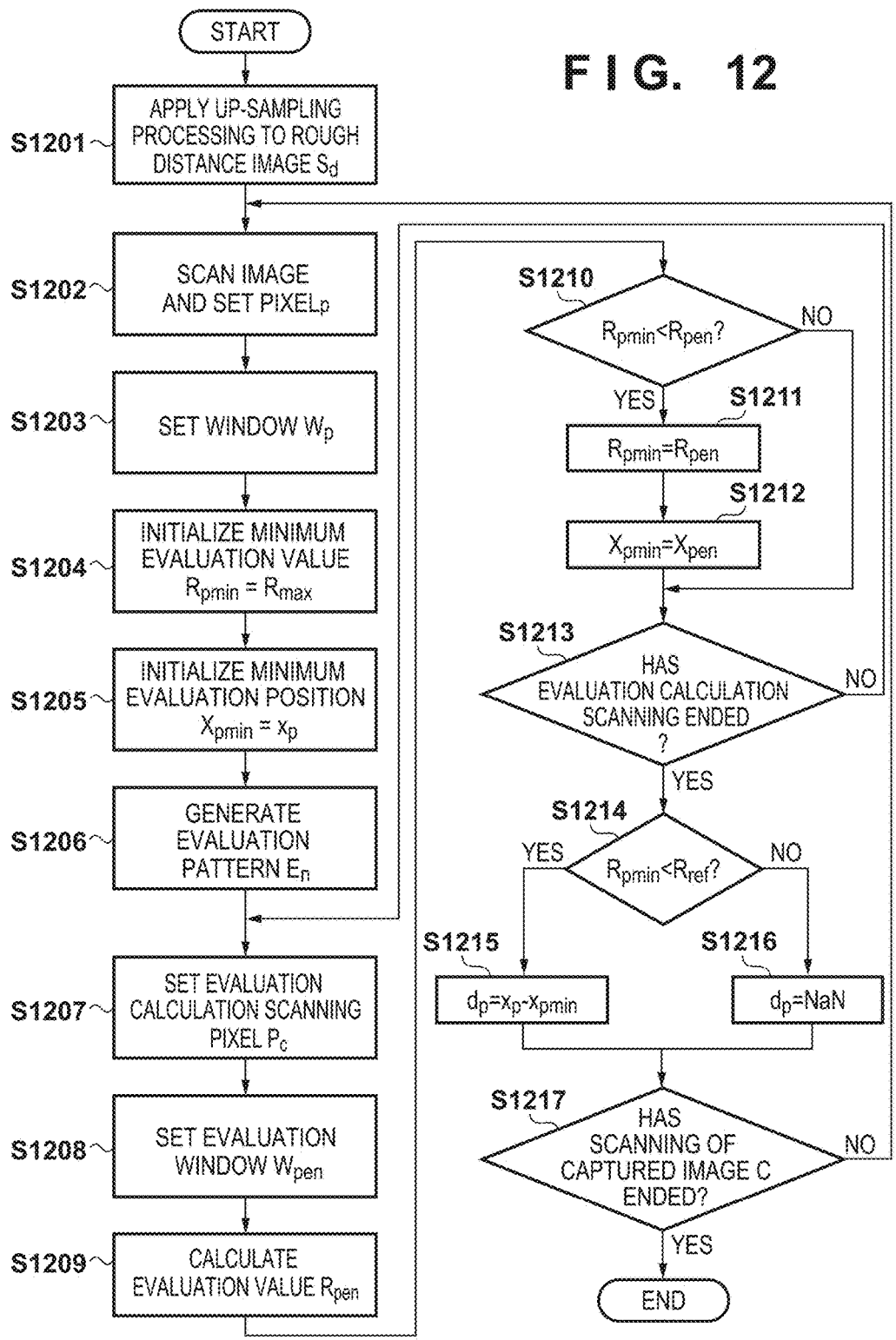
FIG. 12 is a flowchart illustrating processing in step S306.

By executing the processing according to the flowchart shown in FIG. 12 described above, it is possible to calculate the parallax $d_p$ for each pixel of the captured image C. The parallax calculation unit 105 generates a fine parallax image D by aligning the corresponding parallaxes dp according to the arrangement of the pixels of the captured image C. That is, the value (parallax $d_p$) at the pixel position (x, y) in the fine parallax image D represents a parallax corresponding to the pixel at the pixel position (x, y) in the captured image C.

<Step S307>

The three-dimensional shape calculation unit 106 executes the same processing as that in step S305 described above by using the fine parallax image D, the length (baseline length) of the baseline between the projector 102 and the camera 104, and the focal length of the camera 104, thereby obtaining the fine three-dimensional shape of the object 101. In the calculation processing in step S307, with respect to each pixel other than pixels each having the value NaN among the respective pixels forming the fine parallax image D, the three-dimensional coordinate position of the corresponding point $s_d$ is calculated, thereby obtaining a fine distance image S representing the fine three-dimensional shape of the object 101.

As described above, in this embodiment, a projection pattern obtained by compositing a pattern image with a random pixel value for each rectangular region formed from one or a plurality of pixels and a pattern image with a random pixel value for each rectangular region having a size larger than that of the above rectangular region is used. This can reduce a decrease in contrast caused by blurring of a pattern even under the condition that the position of the object falls outside the imaging range of the projection pattern. This makes it possible to more accurately measure the three-dimensional shape of the object.

Note that in this embodiment, in step S301, the projection pattern E is generated using the high-density random number sequence Rh and the low-density random number sequence Rl. However, if the z position of the object can fall within a wider range, the projection pattern E may be generated using three or more kinds of random number sequences. In this case as well, it is only necessary to add numerical values forming pattern images based on the respective random number sequences, and perform binarization by using an intermediate numerical value as a threshold.

In this embodiment, the high-density random number sequence Rh and the low-density random number sequence Rl are generated as random number sequences. However, the present invention is not limited to them. In terms of mathematical characteristics, an M-sequence as one of pseudo random sequences in which a unique partial number sequence can be clearly defined may be used. Using such number sequence allows parallax calculation in a region of a smaller captured image window or evaluation window, resulting in an increase in the measurable region of an object.

In this embodiment, the high-density random number sequence Rh and the low-density random number sequence Rl are generated to generate the projection pattern E. However, instead of generating the random number sequences, an image which is prepared in advance and has the numerical values of a random number sequence as the luminance values of the gray scale may be acquired.

In this embodiment, in each of the first two-dimensional pattern image and the second two-dimensional pattern image, a pixel value is decided for each "rectangular region formed from one or a plurality of pixels" or each "rectangular region having a size larger than that of the above rectangular region". However, in each pattern image, it is not necessary to decide a pixel value for each rectangular region of the same size. For example, by decreasing the size of a rectangular region closer to the central portion of the pattern image, the distance range within which the object can exist decreases in the central portion while it is possible to perform finer measurement.

Furthermore, in this embodiment, when generating the projection pattern $E_n$ in step S1206, each numerical value is set so that the blur amount becomes equal to that when the projection pattern E is projected onto the intermediate position. The present invention, however, is not limited to this. If each numerical value of the Gaussian filter which allows numerically more desirable parallax calculation exists, the numerical value may be arbitrarily changed to an optimum numerical value. By applying a filter in which numerical values are set in consideration of the influence of aberrations of the projector 102 in place of the pure Gaussian filter, it is possible to perform more desirable parallax calculation.

In this embodiment, the projection pattern E is formed using rectangular pixels. The present invention, however, is not limited to this. For example, triangular or hexagonal pixels which can increase the pixel density may be used. Using these pixel shapes allows parallax calculation in a region of a smaller captured image window or evaluation window, resulting in an increase in the measurable region of the object.

The projection pattern generation unit 103, the parallax calculation unit 105, and the three-dimensional shape calculation unit 106 may be implemented by hardware or software (computer programs).

In the former case, the projection pattern generation unit 103, the parallax calculation unit 105, and the three-dimensional shape calculation unit 106 may be implemented as separate apparatuses, or implemented as dedicated hardware components within a single apparatus.

In the latter case, any apparatus including a memory for holding the computer programs and a processor for reading out the computer programs from the memory and executing them is applicable to the image processing apparatus according to this embodiment. The present invention is not limited to implementation of all the functions of the projection pattern generation unit 103, parallax calculation unit 105, and three-dimensional shape calculation unit 106 by hardware or software, and some functions may be implemented by hardware or software, as a matter of course.

[Second Embodiment]

In this embodiment, only processing in step S301 is different from the first embodiment. Therefore, the processing in step S301 according to this embodiment will be mainly described below, and details are the same as in the first embodiment unless otherwise specified. Note that a camera which has a wider dynamic range and lower noise, as compared with the first embodiment, is desirably used as a camera 104.

Figure 17:
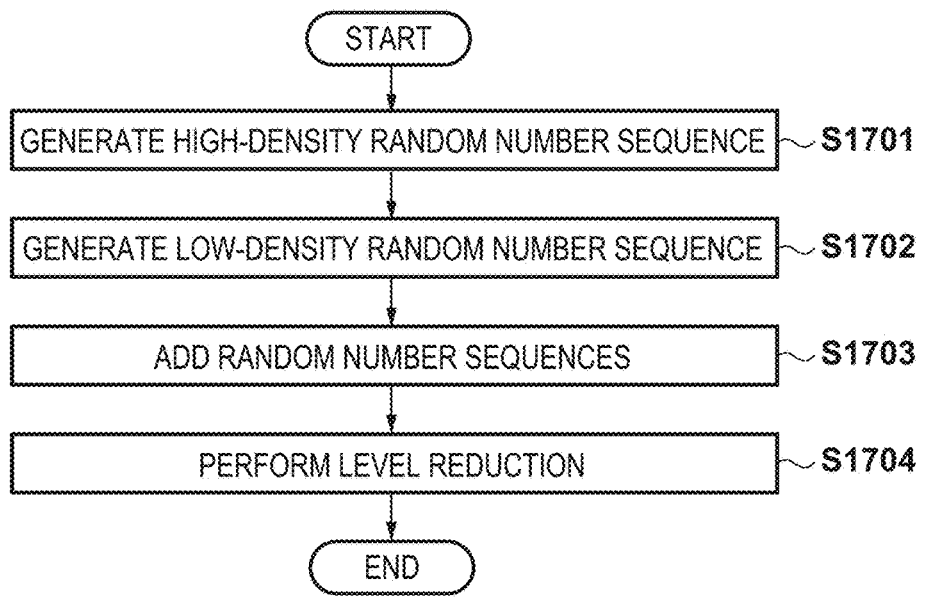
FIG. 17 is a flowchart illustrating details of processing in step S301.

The processing in step S301 according to this embodiment will be described with reference to a flowchart shown in FIG. 17. Processes in steps S1701 to S1703 are the same as those in steps S401 to S403 described above and a description thereof will be omitted.

<Step S1704>

A projection pattern generation unit 103 generates a projection pattern E by performing level reduction for a composite random number sequence. For example, when a first threshold T1 is set as T1=171 and a second threshold T2 is set as T2=374, a luminance value $e_{xy}$ at a pixel position (x, y) in the projection pattern E is calculated based on a value $r_{axy}$ at the position (x, y) in a composite random number sequence $R_a$ as given by:

$$\begin{cases} e_{xy} = 0 & (r_{axy} \leq T_1) \\ e_{xy} = 127 & (T_1 < r_{axy} \leq T_2) \\ e_{xy} = 255 & (T_2 < r_{axy}) \end{cases} \quad (7)$$

Figure 18:
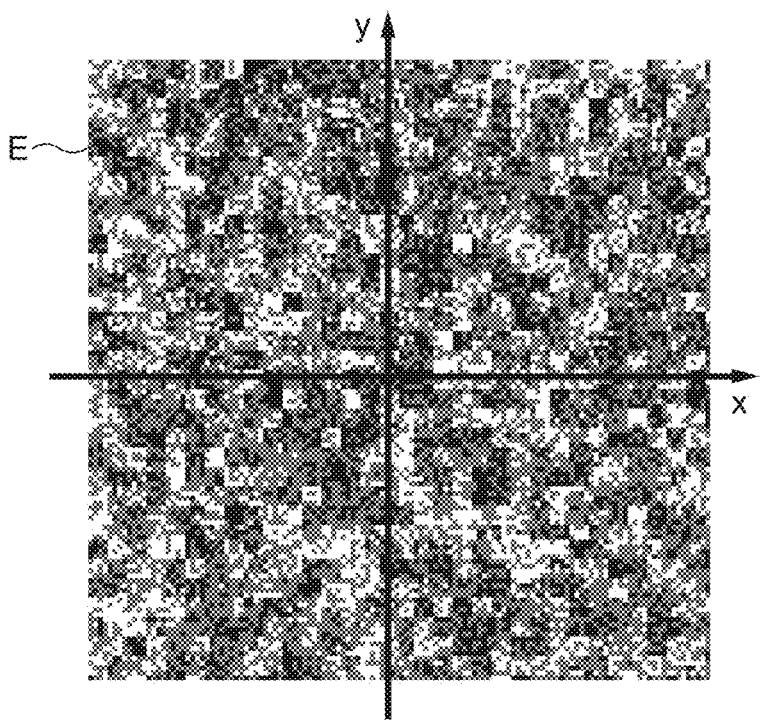
FIG. 18 is a view showing an example of a projection pattern E.

By performing quantization of the luminance value using the first and second thresholds according to equations (7) for each pixel position in the composite random number sequence $R_a$ it is possible to generate the projection pattern E as a ternary image having a lowest luminance value of 0, an intermediate luminance value of 127, and a maximum luminance value of 255. FIG. 18 shows an example of the thus generated projection pattern E.

As described above, according to this embodiment, a ternary projection pattern which includes an information amount larger than that of a binary projection pattern is used, and it is thus possible to more accurately acquire a parallax image. Consequently, it is possible to reduce a region where the three-dimensional shape of an object cannot be measured.

Note that in this embodiment, in step S1704, the ternary projection pattern E is generated by setting the luminance values based on three levels. The present invention, however, is not limited to this. If the higher-performance camera 104 in terms of the dynamic range and low-noise performance can be used, a projection pattern of four or more levels may be generated by making finer level setting. Using a projection pattern of four or more levels can further reduce a region where the three-dimensional shape of the object cannot be measured.

[Third Embodiment]

In this embodiment, only processing in step S301 is different from the first embodiment. Therefore, the processing in step S301 according to this embodiment will be mainly described below, and details are the same as in the first embodiment unless otherwise specified.

Figure 19:
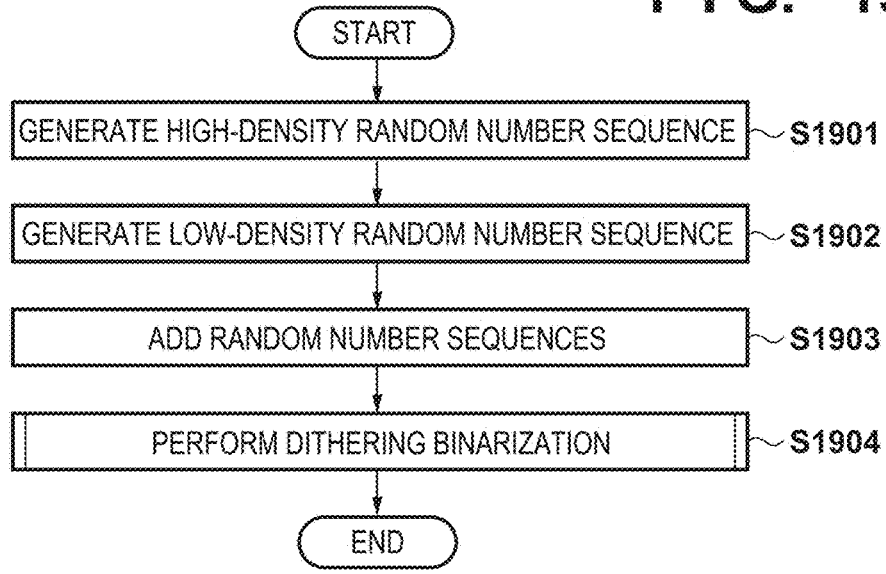
FIG. 19 is a flowchart illustrating details of processing in step S301.

The processing in step S301 according to this embodiment will be described with reference to a flowchart shown in FIG. 19. Processes in steps S1901 to S1903 are the same as those in steps S401 to S403 described above and a description thereof will be omitted.

<Step S1904>

Figure 20:
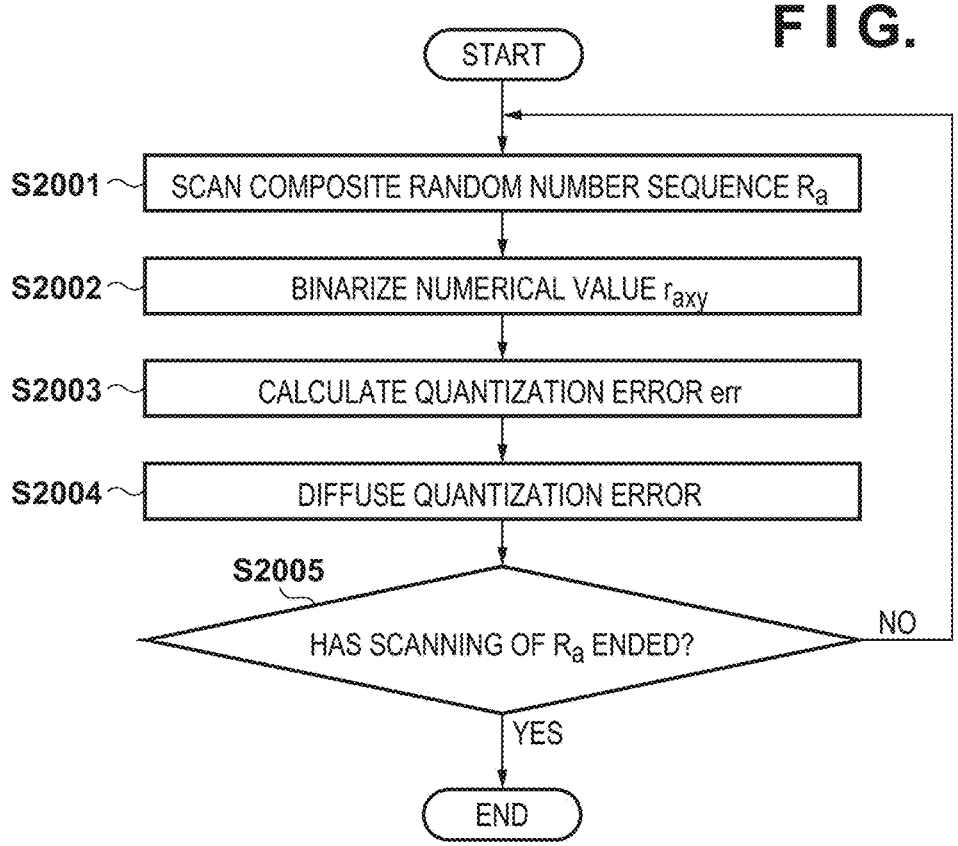
FIG. 20 is a flowchart illustrating details of processing in step S1904.

A projection pattern generation unit 103 performs pseudo multi-level processing by applying Floyd-Steinberg dithering processing to a composite random number sequence $R_a$, thereby generating a binary projection pattern E. The processing in step S1904 will be described in detail with reference to a flowchart shown in FIG. 20.

<Step S2001>

A target pixel position is set on each of the composite random number sequence $R_a$ and the projection pattern E. When the processing in this step is performed for the first time, the upper left corner pixel position of the composite random number sequence $R_a$ is set as a target pixel position while the upper left pixel position of the projection pattern E is set as a target pixel position.

<Step S2002>

The result of binarizing a value $r_{axy}$ at a target pixel position (x, y) in the composite random number sequence $R_a$ is set as a pixel value $e_{xy}$ at the target pixel position (x, y) in the projection pattern E. Since the value $r_{axy}$ takes a value between 0 and 510, an intermediate value of 255 is set as a threshold. If the value $r_{axy}$ is larger than 255, the pixel value $e_{xy}$ is set to 510. If the value $r_{axy}$ is smaller than 255, the pixel value $e_{xy}$ is set to 0.

<Step S2003>

A quantization error err is obtained using the pixel value $e_{xy}$ at the target pixel position (x, y) in the projection pattern E and the pixel value $r_{axy}$ at the target pixel position (x, y) in the composite random number sequence $R_a$, as given by:

$$err = r_{axy} - e_{xy} \quad (8)$$

<Step S2004>

The quantization error err calculated in step S2003 is diffused around the target pixel position (x, y) in the composite random number sequence $R_a$. Assume that a pixel value at the right adjacent pixel position of the target pixel position (x, y) is represented by $r_{a\,(x+1)y}$, a pixel value at the lower left pixel position of the target pixel position (x, y) is represented by $r_{a\,(x-1)(y+1)}$, a pixel value at the pixel position immediately below the target pixel position (x, y) is represented by $r_{ax(y+1)}$, and a pixel value at the lower right pixel position of the target pixel position (x, y) is represented by $r_{a\,(x+1)(y+1)}$. In this case, the above diffusion updates these pixel values according to:

$$\begin{cases} r_{a(x+1)y} = r_{a(x+1)y} + \text{err}\frac{7}{16} \\ r_{a(x-1)(y+1)} = r_{a(x-1)(y+1)} + \text{err}\frac{3}{16} \\ r_{ax(y+1)} = r_{ax(y+1)} + \text{err}\frac{5}{16} \\ r_{a(x+1)(y+1)} = r_{a(x+1)(y+1)} + \text{err}\frac{1}{16} \end{cases} \quad (9)$$

<Step S2005>

It is determined whether all the pixel positions on the composite random number sequence $R_a$ (projection pattern E) have been set as the target pixel position. If it is determined that all the pixel positions on the composite random number sequence $R_a$ (projection pattern E) have been set as the target pixel position, the process advances to step S302.

On the other hand, if, among all the pixel positions on the composite random number sequence $R_a$ (projection pattern E), a pixel position which has not been set as the target pixel position remains, the process returns to step S2001 to set the right adjacent pixel position of the current target pixel position as the next target pixel position. Note that if the current target pixel position is at the right end of the composite random number sequence $R_a$ (projection pattern E), and there is no right adjacent pixel position of the current target pixel position, the y-coordinate value of the current target pixel position is incremented by one, and the x-coordinate value is set to 0 (left end). FIG. 21 shows an example of the projection pattern E generated by executing the processes in steps S2001 to S2005 described above.

In this embodiment, pseudo multi-level processing is performed using peripheral pixels as level reduction. Therefore, a projection pattern over which dark points and bright points are uniformly distributed, as compared with the first embodiment, is generated. Using such projection pattern allows more desirable three-dimensional measurement of an object within a measurable range. Note that since the depth of field becomes smaller, the possible range of the z position of the object becomes narrower.

Note that the projection pattern E is binarized in step S2002 in this embodiment. The present invention, however, is not limited to this. If the higher-performance camera 104 in terms of the dynamic range and low-noise performance is usable, a projection pattern of three or more levels (N-ary processing (N is an integer of 3 or more)) may be generated by making finer level setting. Using a multi-level projection pattern of three or more levels can further reduce the region where the three-dimensional shape of the object cannot be measured.

Although the Floyd-Steinberg dithering algorithm is adopted as level reduction in step S1904 in this embodiment, the present invention is not limited to this. Another pseudo multi-level method may be used according to the purpose such as a case in which it is desirable to generate a projection pattern whose contrast is more difficult to decrease for blurring or a case in which it is desirable to generate a finer projection pattern. For example, it is possible to generate a projection pattern whose contrast is more difficult to decrease for blurring by using an average dithering method. On the other hand, it is possible to generate a finer projection pattern using a random dithering method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007270, filed Jan. 17, 2014, which is hereby incorporated by reference herein in its entirety.

What is claimed is:

1. An image processing apparatus comprising:
a projection unit configured to project, onto an object, a projection pattern;
a capturing unit configured to capture the object onto which the projection pattern has been projected; and
a measurement unit configured to:
measure approximate distance information of the object based on the projection pattern projected by the projection unit and an image captured by the capturing unit;

determine, on the basis of the measured approximate distance information, whether each region of the projection pattern included in the image captured by the capturing unit blurs; and measure, for a region determined as blurring, distance information to the object on the basis of correlation between (1) the image captured by the capturing unit and (2) an image obtained by performing blurring processing for the projection pattern.

2. The apparatus according to claim 1, wherein an in-focus position of the projection pattern by the projection unit is a position farther away from a position of the object from the viewpoint of the projection unit.

3. The apparatus according to claim 1, wherein the projection pattern is an image obtained by compositing a first two-dimensional pattern image and a second two-dimensional pattern image, and wherein a pixel value of each pixel of the projection pattern is obtained by performing N-ary (N is an integer not less than two) processing for a sum of pixel values of pixels corresponding to the pixel in the first two-dimensional pattern image and the pixel in the second two-dimensional pattern image.

4. The apparatus according to claim 1, wherein the projection pattern is an image obtained by compositing a first two-dimensional pattern image and a second two-dimensional pattern image, and wherein the projection pattern is a pattern image obtained by performing pseudo multi-level processing for a pattern image obtained by compositing the first two-dimensional pattern image and the second two-dimensional pattern image.

5. The apparatus according to claim 1, wherein the measurement unit measures the approximate distance information of the object based on a reduced projection pattern obtained by reducing the projection pattern and a reduced image obtained by reducing the captured image.

6. The apparatus according to claim 1, wherein the approximate distance information of the object indicates three-dimensional coordinates of a surface of the object.

7. The apparatus according to claim 1, wherein the projection pattern is an image obtained by compositing a first two-dimensional pattern image and a second two-dimensional pattern image, wherein when a region formed from at least one pixel is set as a first unit area, and a region having a size larger than that of the first unit area is set as a second unit area, each first unit area of the first two-dimensional pattern image is assigned with one of a plurality of pixel values, and each second unit area of the second two-dimensional pattern image is assigned with one of the plurality of pixel values.

8. The apparatus according to claim 7, wherein the first unit area and the second unit area are assigned with pixel values of the plurality of pixel values, which have been decided randomly or pseudo-randomly.

9. The apparatus according to claim 7, wherein the sizes of the first unit area and the second unit area are uniform.

10. The apparatus according to claim 7, wherein the size of the first unit area is smaller as a distance to a central portion of the first two-dimensional pattern image is shorter, and the size of the second unit area is smaller as a distance to a central portion of the second two-dimensional pattern image is shorter.

11. The apparatus according to claim 1, wherein the measurement unit measures the approximate distance information of the object based on correlation between a pixel value within a region having a predetermined size in an image based on the projection pattern projected by the projection unit and a pixel value within a region having a predetermined size in an image based on an image captured by the capturing unit.

12. The apparatus according to claim 1, wherein the measurement unit further measures, for a region determined as not blurring, distance information to the object on the basis of correlation between the image captured by the capturing unit and the projection pattern.

13. The apparatus according to claim 1, wherein the measurement unit determines that the region of the projection pattern included in the image captured by the capturing unit blurs in a case where a distance corresponding to the region of the projection pattern included in the captured image is larger than a depth of field of the projection unit.

14. An image processing method comprising:
projecting, onto an object, a projection pattern;
capturing the object onto which the projection pattern has been projected;
measuring approximate distance information of the object based on the projection pattern and an image captured in the capturing;
determining, on the basis of the measured approximate distance information, whether each region of the projection pattern included in the captured image blurs; and
measuring, for a region determined as blurring, distance information to the object on the basis of correlation between (1) the captured image and (2) an image obtained by performing blurring processing for the projection pattern.

15. A non-transitory computer-readable storage medium storing a computer program for causing a computer to execute each step of an image processing method comprising:
projecting, onto an object, a projection pattern;
capturing the object onto which the projection pattern has been projected;
measuring approximate distance information of the object based on the projection pattern and an image captured in the capturing;
determining, on the basis of the measured approximate distance information, whether each region of the projection pattern included in the captured image blurs; and
measuring, for a region determined as blurring, distance information to the object on the basis of correlation between (1) the captured image and (2) an image obtained by performing blurring processing for the projection pattern.

* * * * *